United States Patent
Hung (10) Patent No.: US 9,369,384 B2
(45) Date of Patent: Jun. 14, 2016

(54) SERVER SYSTEM CONNECTION PROCESS METHOD PREVENTING NETWORK CONGESTION

(71) Applicant: Tso-Sung Hung, Zhubei (TW)

(72) Inventor: Tso-Sung Hung, Zhubei (TW)

( * ) Notice: Subject to any disclaimer, the term of this patent is extended or adjusted under 35 U.S.C. 154(b) by 0 days.

(21) Appl. No.: 14/542,087

(22) Filed: Nov. 14, 2014

(65) Prior Publication Data

US 2015/0074186 A1 Mar. 12, 2015

Related U.S. Application Data (63) Continuation-in-part of application No. 14/021,571, filed on Sep. 9, 2013, which is a continuation-in-part of application No. 12/729,092, filed on Mar. 22, 2010, now abandoned.

(51) Int. Cl.
*H04L 12/801* (2013.01)
*H04L 29/08* (2006.01)
*H04L 29/06* (2006.01)

(52) U.S. Cl.
CPC .............. *H04L 47/10* (2013.01); *H04L 67/101* (2013.01); *H04L 67/1002* (2013.01); *H04L 67/02* (2013.01); *H04L 67/1008* (2013.01); *H04L 67/2871* (2013.01); *H04L 69/12* (2013.01); *H04L 69/162* (2013.01); *H04L 69/163* (2013.01)

(58) Field of Classification Search
None
See application file for complete search history.

(56) References Cited

U.S. PATENT DOCUMENTS

| | | | |
|---|---|---|---|
| 5,944,783 A * | 8/1999 | Nieten | G06F 9/546 709/202 |
| 2005/0125508 A1 | 6/2005 | Smith et al. | |
| 2006/0190455 A1 | 8/2006 | Braddy et al. | |
| 2007/0245409 A1* | 10/2007 | Harris | H04L 63/0272 726/5 |
| 2008/0066080 A1* | 3/2008 | Campbell | G06F 17/3089 719/314 |
| 2010/0023582 A1 | 1/2010 | Pedersen et al. | |
| 2010/0085883 A1 | 4/2010 | Paster | |
| 2010/0107225 A1 | 4/2010 | Spencer et al. | |
| 2010/0128598 A1* | 5/2010 | Gandhewar | H04L 67/2814 370/217 |
| 2010/0223385 A1 | 9/2010 | Gulley et al. | |
| 2010/0262650 A1 | 10/2010 | Chauhan et al. | |
| 2011/0026403 A1 | 2/2011 | Shao et al. | |
| 2011/0066676 A1 | 3/2011 | Kleyzit et al. | |

* cited by examiner

*Primary Examiner* — Natisha Cox
(74) *Attorney, Agent, or Firm* — Muncy, Geissler, Olds & Lowe, P.C.

(57) ABSTRACT

A server connection process method that can prevent network congestion is adopted for use on a server system which includes client ends, an Internet and a server host. The server host includes a dynamic port allocation module, a plurality of question and answer process units and a plurality of application service units. Each client end has a port preset selection unit to preset and automatically select an idle question and answer port in the dynamic port allocation module to form connection to the question and answer process unit to process requirement questions, then select an idle application port in the dynamic port allocation module to connect to a required application service unit to process required services. Through the dynamic port allocation module under TCP/IP, the invention allows the client end to have multiple ports for selection.

5 Claims, 6 Drawing Sheets

SERVER SYSTEM CONNECTION PROCESS METHOD PREVENTING NETWORK CONGESTION

This application is a continuation-in-part, and claims priority, from U.S. patent application Ser. No. 12/729,092 filed on Mar. 22, 2010, entitled "INFORMATION SERVICE PLATFORM EQUIPPED WITH DYNAMIC DISTRIBUTION OPERATORS" and U.S. patent application Ser. No. 14/021,571 filed on Sep. 9, 2013, entitled "INFORMATION SERVICE PLATFORM PROVIDING DYNAMIC DISTRIBUTION OPERATORS", the entire contents of which are hereby incorporated by reference.

FIELD OF THE INVENTION

The present invention relates to a server system and particularly to a server system connection method that can prevent network congestion.

BACKGROUND OF THE INVENTION

Using of the Internet has become one of life necessities in the modern society. The rising of Internet of Things and Cloud has brought revolutionary changes in the world. Through setting up a network platform a great deal of industries have provided channels and exchange media to enable users to enjoy entertainments, shopping or advertising easier. In such an environment the most important element is establishing of server and network system. However, the network system also encounters a lot of problems, such as network congestion due to too many users, or network paralysis caused by malicious attack from hackers. All this has created constant annoyances in many industries.

At present Internet network transmission among computers is done through an Internet transmission layer. Application servers mostly adopt the protocol of TCP or UDP. Different application servers have different corresponding ports, such as a server application routine connecting to a public port number to provide network services; or an application server provides an application program execution environment; thereby allows the application programs to provide services of large scale distributed system management such as security, data, business support, load balancing and the like. Although server programs can execute different applications, when adopted HTTP as a Webpage server program and a network application server has received a HTTP request, a HTTP reply is sent to the requester. The Request message of HTTP is placed in queues. Hence it has an inherent constraint in application. The general practice is including one or more reserved positions to respond contents. Then HTTP applies a first-in-first-out (FIFO in short hereinafter) message receiving mode. Commands are executed sequentially in a request processor. This is what causes the problem of Webpage services or HTTP services when a heavy connection load takes place. Congestion at the front end of the queues is an avoidable problem. In the event that network hacking caused by DDoS occurs, network resources and system resources could be overwhelmed and result in network paralysis. HTTP rules and architecture specify to use a greater bandwidth and reduced packets to resolve the message congestion problem. HTTP also suggests to adopt HTTP pipelining technique to send multiple HTTP requests in batch, and no need to wait response of the server end during transmission. However, the server end still has to resume the requests according to client end's request sequence. Hence the entire connection still is FIFO, and it does not help much in resolving the problem of message congestion. In the event that the server adopts another practice of URL Redirection, according to suggestions specified in the HTTP/1.0 version, browser shall not do redirection of automatic access more than five times to avoid unnecessary consumption of a large amount of resources at the server end and client end. Furthermore, in the event that the HTTP application server has set a communication port to execute HTTP message receiving and sending, no multiple sets of HTTP servers are allowed under a same computer, as the HTTP protocol has specified to adopt asynchronous transmission method of a single-threaded control.

Due to the aforesaid Webpage application program server that adopts a passive response mechanism and HTTP has many constraints, such as URL transferring connection to the Webpage address of a corresponding application server, however the general network congestion is not taking place in the Internet routing system, but in a specific network server host, i.e., too many users are connected at the same time to a single application server that results in all the users are jammed and waiting for response of the application server, this also makes the application server responding slower, and cannot process corresponding access.

To resolve the problem mentioned above, the general approach is expanding the network bandwidth and increasing the number of network servers, this makes the cost higher. Moreover, adding the servers has its limitation. In the event of attacking by malicious network hackers, such a physical improvement approach is not cost effective.

SUMMARY OF THE INVENTION

The primary object of the present invention is to solve the problem of network congestion when a great number of people try to connect to a single server host at the same time.

Another object of the invention is to resolve the problem of resolving network congestion by increasing flow amount or server host that is not cost effective.

To achieve the foregoing objects the present invention provides a server system connection method that can prevent network congestion. The method includes the steps as follows:

S1: Set a port preset selection unit on at least one client end based on a transmission control protocol corresponding to a plurality of question and answer ports in a server host, each question and answer port being connected to a question and answer process unit;

S2: Connect the client end to an idle question and answer port of the server host via the port preset selection unit through an Internet;

S3: Process question and answer through the question and answer process unit connected to the question and answer port, and select a suitable application service unit among the application service units in the server host;

S4: Confirm an idle application port corresponding to the application service unit through a monitor allocation unit;

S5: Transfer connection of the client end to the idle application port to connect to the application service unit to execute application service; and S6: Transform the question and answer port corresponding to the question and answer process unit to an idle state after the transfer connection is finished, continue connection of another client end.

Through the method set forth above, the invention provides features as follows:

1. The network congestion problem that might otherwise occur in a single server host based on Transmission Control Protocol (TCP) is resolved, hence can overcome the not cost effective problem of increasing network bandwidth or network server host that might otherwise need.

2. By collaborating a dynamic port allocation module and the question and answer process units the client end can be rapidly and effectively directed to get a corresponding application service unit to distribute flow, thereby avoid network congestion and network hacking.

3. By collaborating the port preset selection units and the question and answer port quantity in the dynamic port allocation module to do setting in advance, an idle question and answer port can be selected for connection during the connection process to avoid connection queue preventing network congestion.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
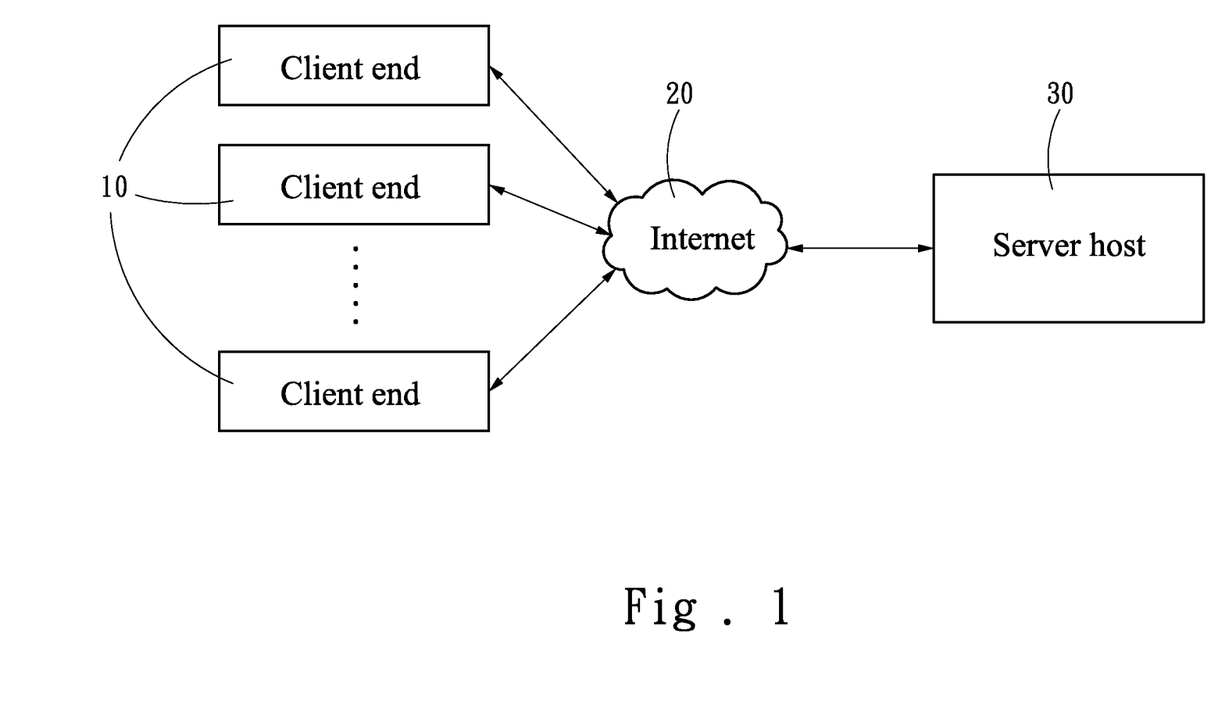
FIG. 1 is a schematic view of network connection according to the invention.
Figure 2:
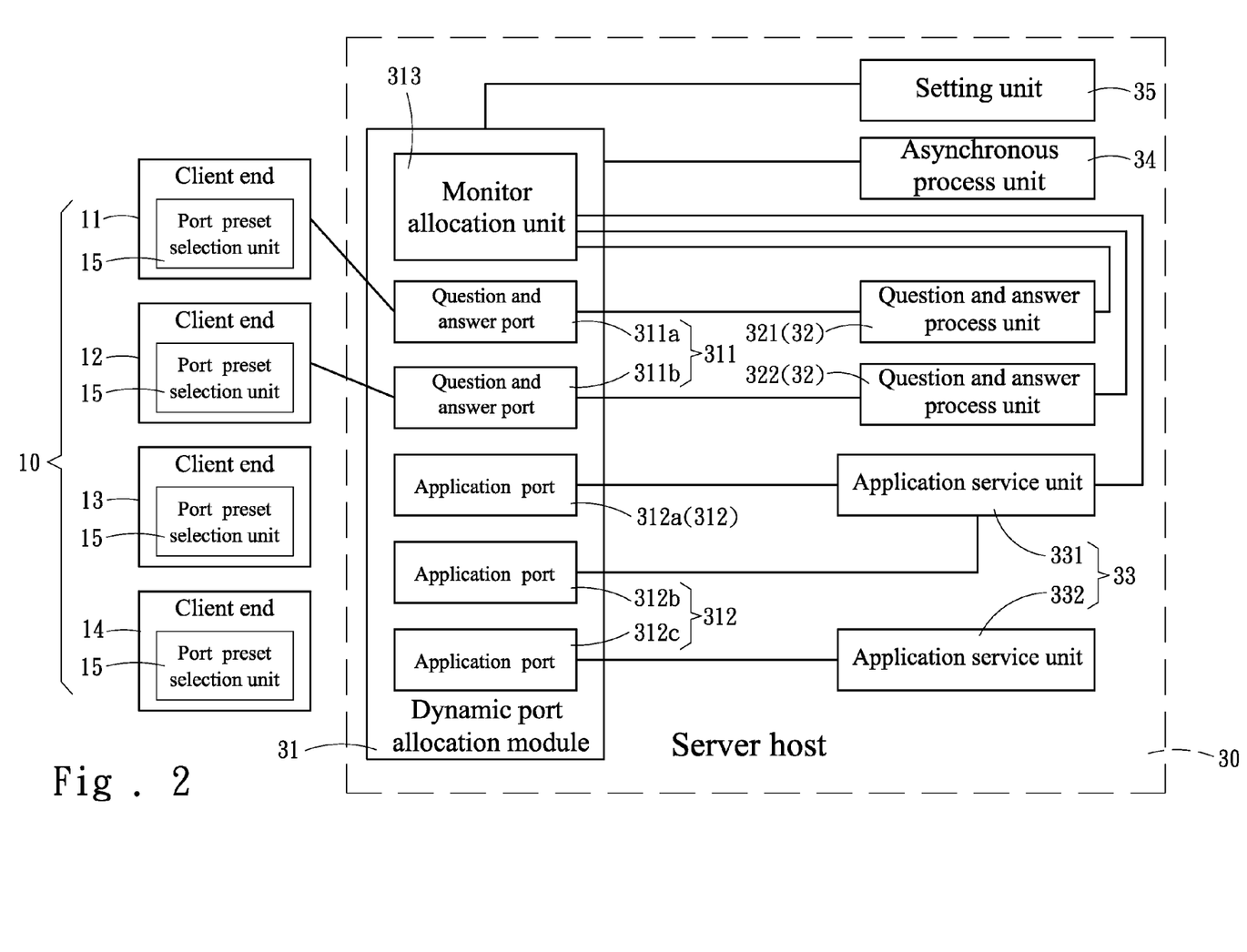
FIG. 2 is a system block diagram of the invention.

Please referring to FIGS. 1 and 2, the present invention aims to provide a server system that can prevent network congestion. It includes a server host 30, an Internet 20 and at least one client end 10. The server host 30 includes a dynamic port allocation module 31 based on Transmission Control Protocol/Internet Protocol (TCP/IP), a plurality of question and answer process units 32 and a plurality of application service units 33 connected to the dynamic port allocation module 31. The dynamic port allocation module 31 includes a monitor allocation unit 313, a plurality of question and answer ports 311 connected respectively to the question and answer process units 32 and a plurality of application ports 312 connectable by the application service units 33. The monitor allocation unit 313 monitors used and idle status of the application ports 312, and allocates the idle application port 312 to the client end 10 to connect and use. The client end 10 includes a port preset selection unit 15 connected to the server host 30 via the Internet 20. In this embodiment a plurality of client ends 11, 12, 13 and 14 are included. The port preset selection unit 15 corresponds to the dynamic port allocation module 31, and based on the TCP/IP presets connection positions of the question and answer ports 311, and selects the idle question and answer ports 311 via automatic polling to establish connection.

The question and answer process units 32 process and confirm requirements of the client end 10, confirm and get the idle status or service state of the application ports 312 through the monitor allocation unit 313, respond the client end 10 to change its targeted port location, and connect the client end 10 to the idle application port 312 to link to the requested application service unit 33 to execute application services. The question and answer process units 32 further have a priority mechanism to grant priority to the client end 10 to access the application service units 33 in priority.

Furthermore, the server host 30 includes an asynchronous process unit 34 which is connected to the dynamic port allocation module 31 to allow the question and answer process units 32 and the application service units 33 to do asynchronous processes. In addition, the port preset selection unit 15 at the client end 10 is sequentially connected to the question and answer ports 311, and confirms and selects the idle question and answer port 311 to connect to the question and answer process unit 32 to process downstream question and answer services. Each application service unit 33 can be mated and connected respectively to multiple application ports 312 to link multiple client ends 10 at the same time.

In addition, the server host 30 further includes a setting unit 35 to set quantity, groups and allocation of the question and answer ports 311 and the application ports 312 of the dynamic port allocation module 31.

Figure 3:
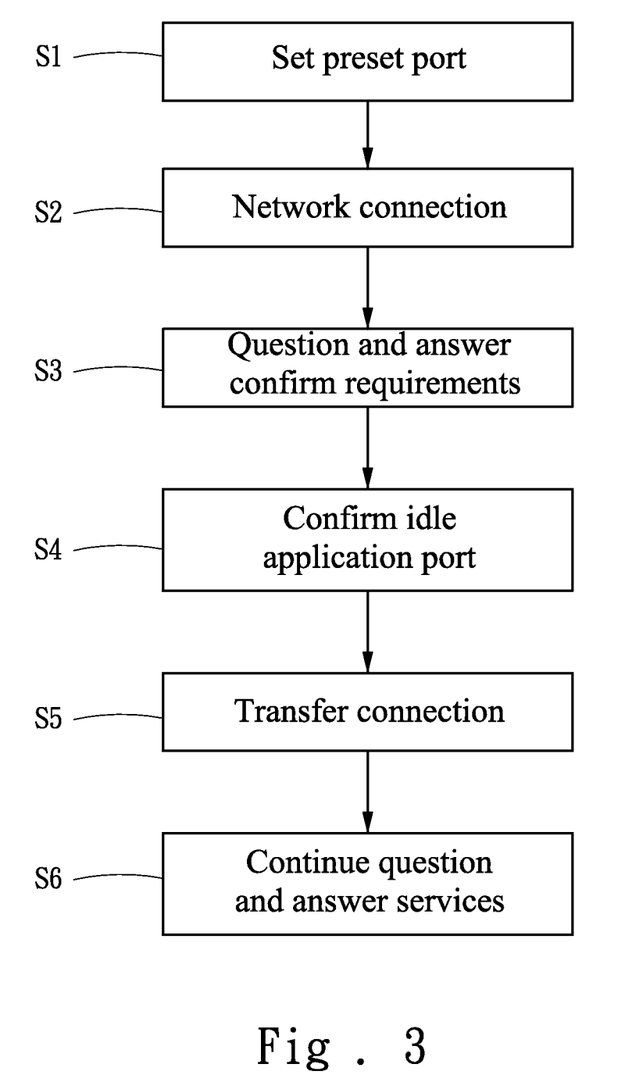
FIG. 3 is a process flowchart of the invention.
Figure 4A:
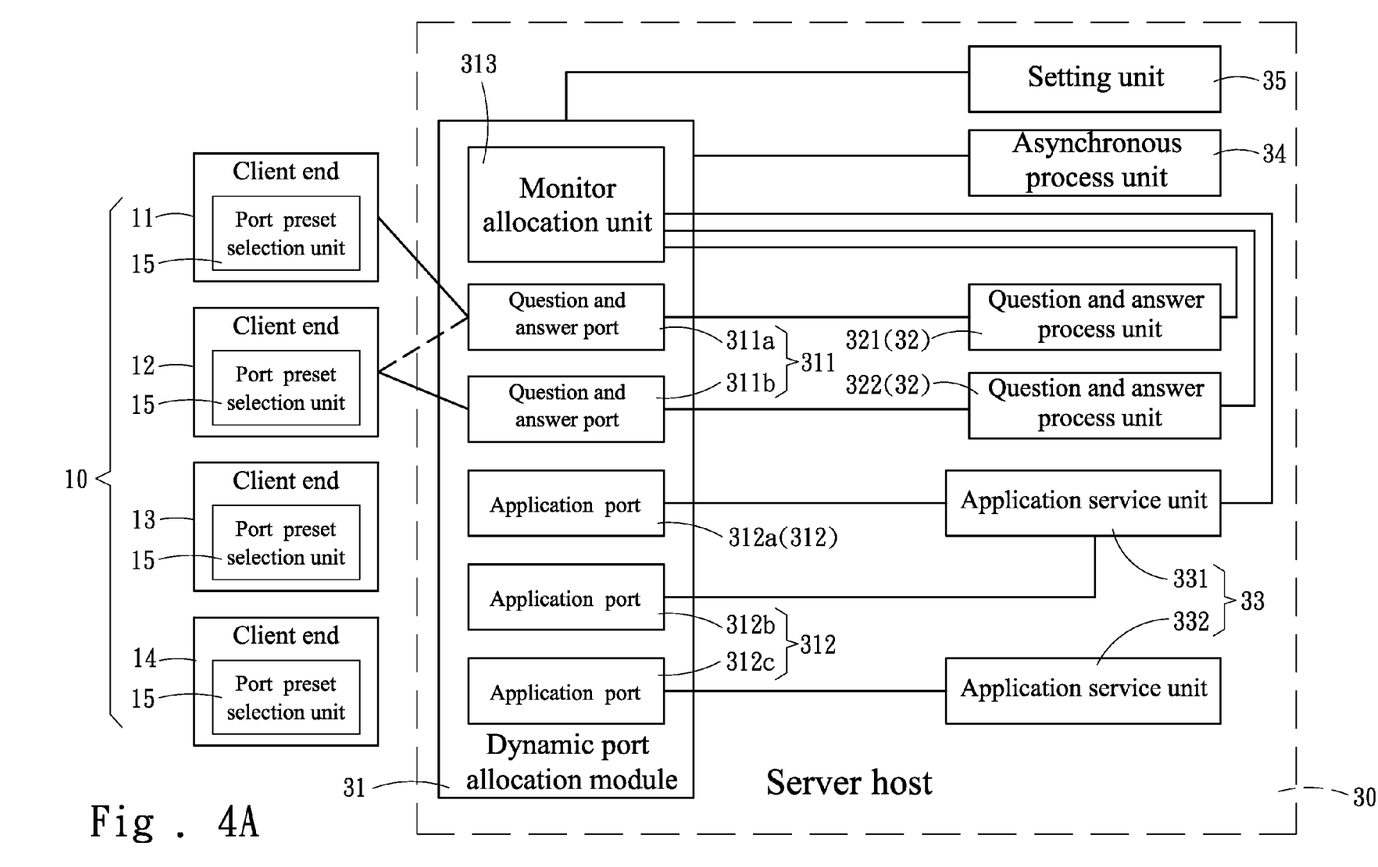
FIG. 4A is a schematic view of port connection according to the invention.

Please also referring to FIGS. 3 and 4A, implementation of the invention is discussed through the server system connection process method that can present network congestion of the invention as depicted below. It is to be noted that this embodiment is based on HTTP Webpage access method, but it is not the limitation of the invention. The method includes the steps as follows:

S1: Set preset ports: Set a port preset selection unit 15 on at least one client end 10 based on TCP/IP corresponding to a plurality of question and answer ports 311 of a server host 30, each question and answer port 311 is connected to a question and answer process unit 32. When the client end 10 is connected to the server host 30 via a HTTP Web address (Uniform Resource Locator, or URL in short hereinafter), the HTTP URL belongs to an application layer. In general, in TCP the preset HTTP is 80 for the connection port under the transmission layer. In the event that the server host 30 intends to change the connection port location the client end 10 has to change the connected connection port location corresponding to the server host 30 to make smooth connection to the server host 30. For instance, in this embodiment the question and answer port 311 has two sets of 1001 and 1002, then the port preset selection unit 15 presets two sets of numbers 1001 and 1002.

S2: Network connection: Connect the client end 10 to an idle question and answer port 311 of the server host 30 via the port preset selection unit 15 through the Internet 20 (referring to FIG. 1). In this embodiment the port preset selection unit 15 sequentially makes connection to the question and answer ports 311 until an idle question and answer port 311 is connected. Also referring to FIG. 4A, when one client end 11 was already connected to the question and answer port 311a, and another client end 12 is trying to connect to the question and answer port 311a and finds out that it is occupied (shown by dotted line), the another client end 12 automatically tries to connect to another question and answer port 311b, and if it is confirmed idle, then connection is made to link to the question an answer process unit 322.

S3: Question and answer to confirm requirements. The clients end 11 and 12 process requirement question and answer respectively through the question process units 321 and 322 connected to the question and answer ports 311a and 311b, and select suitable application service units 33 among the application service units 33 in the server host 30.

S4: Confirm an idle application port 312. Since the idle states of the question and answer ports 311a and 311b, and the application ports 312a, 312b and 312c are controlled by the monitor allocation unit 313, when the question and answer process unit 32 has confirmed the required service of the client end 10, the monitor allocation unit 313 confirms whether the corresponding application port 312 of the application service unit 33 is idle, then allocates the idle application port 312.

Figure 4B:
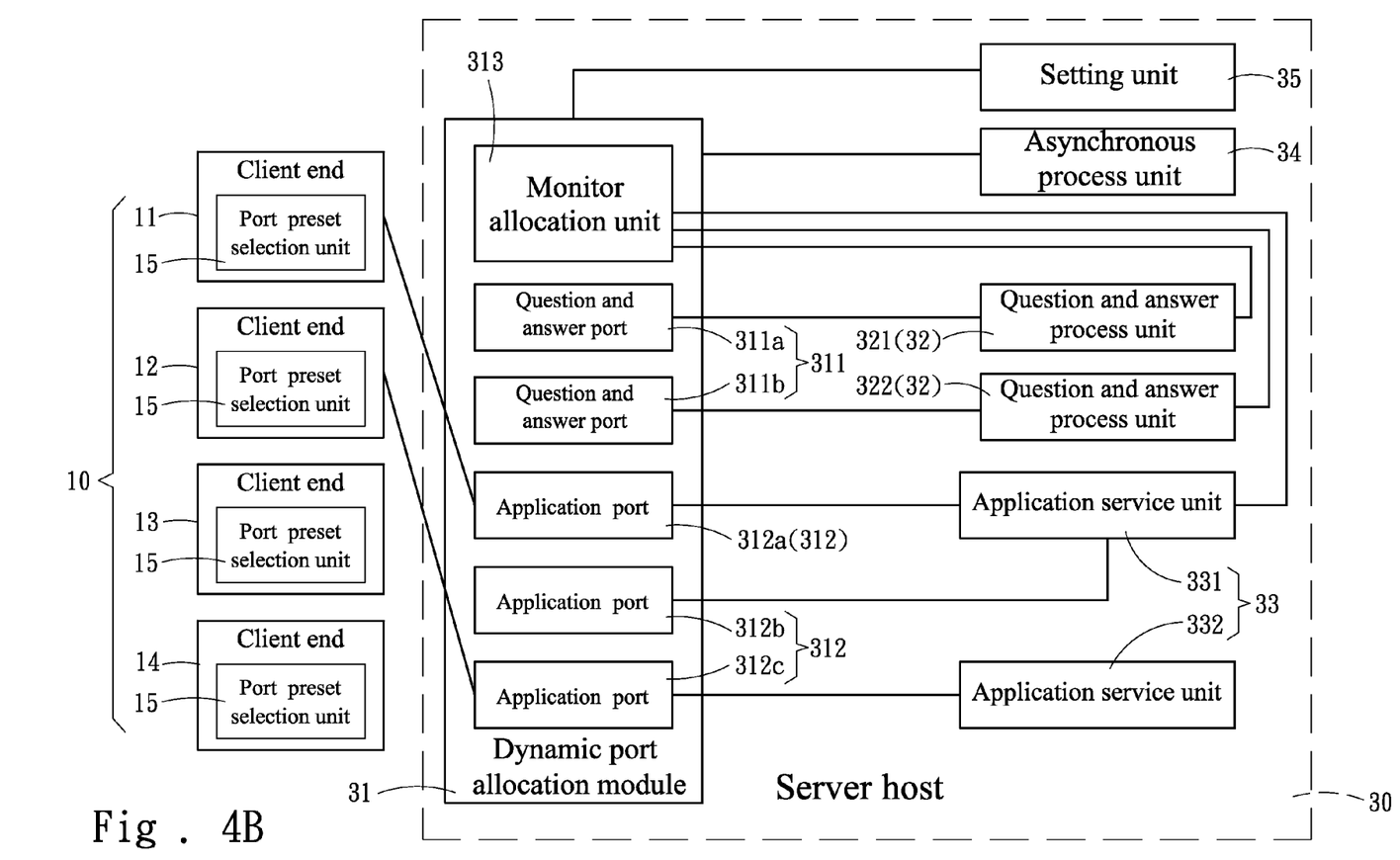
FIG. 4B is another schematic view of port connection according to the invention.

S5: Transfer connection service: Please referring to FIG. 4B, in this embodiment if the client ends 11 and 12 require different services, the client end 11 can be transferred through the idle application port 312a to connect to the application service unit 331, while another client end 12 is transferred via the idle application port 312c to connect to another application service unit 332, thereby execute respectively the required application service. In addition, each application service unit 33 also can be corresponding to a plurality of application ports 312. For instance, in this embodiment the application service units 331 are grouped to connect to the application ports 312a and 312b. When one application port 312a is occupied in connection, another application port 312b can be allocated for connection, or two client ends 10 can be connected at the same time. It is to be noted that, due to the question and answer ports 311a and 311b, and the application ports 312a, 312b and 312c are connected asynchronously to the client ends 10, the question and answer process units 32 and the application service units 33 via the asynchronous process unit 34, the application service unit 331 can be connected to two client ends 10 through the application ports 312a and 312b to process the requirements of the two client ends 10 at the same time. In practice, the setting unit 35 can set multiple application ports 312 into one group corresponding to a same application service unit 33. When the question and answer process unit 32 has transferred connection of the client end 10 to one of the application port 312 of the group, a direct connection to the corresponding application service unit 33 is made to meet operation requirement. Furthermore, change the connection port is made by sending back a location message of an idle application port 312 via the dynamic port allocation module 31 to the client end 10 so that the client end 10 can change the connection location of the corresponding port.

Figure 5:
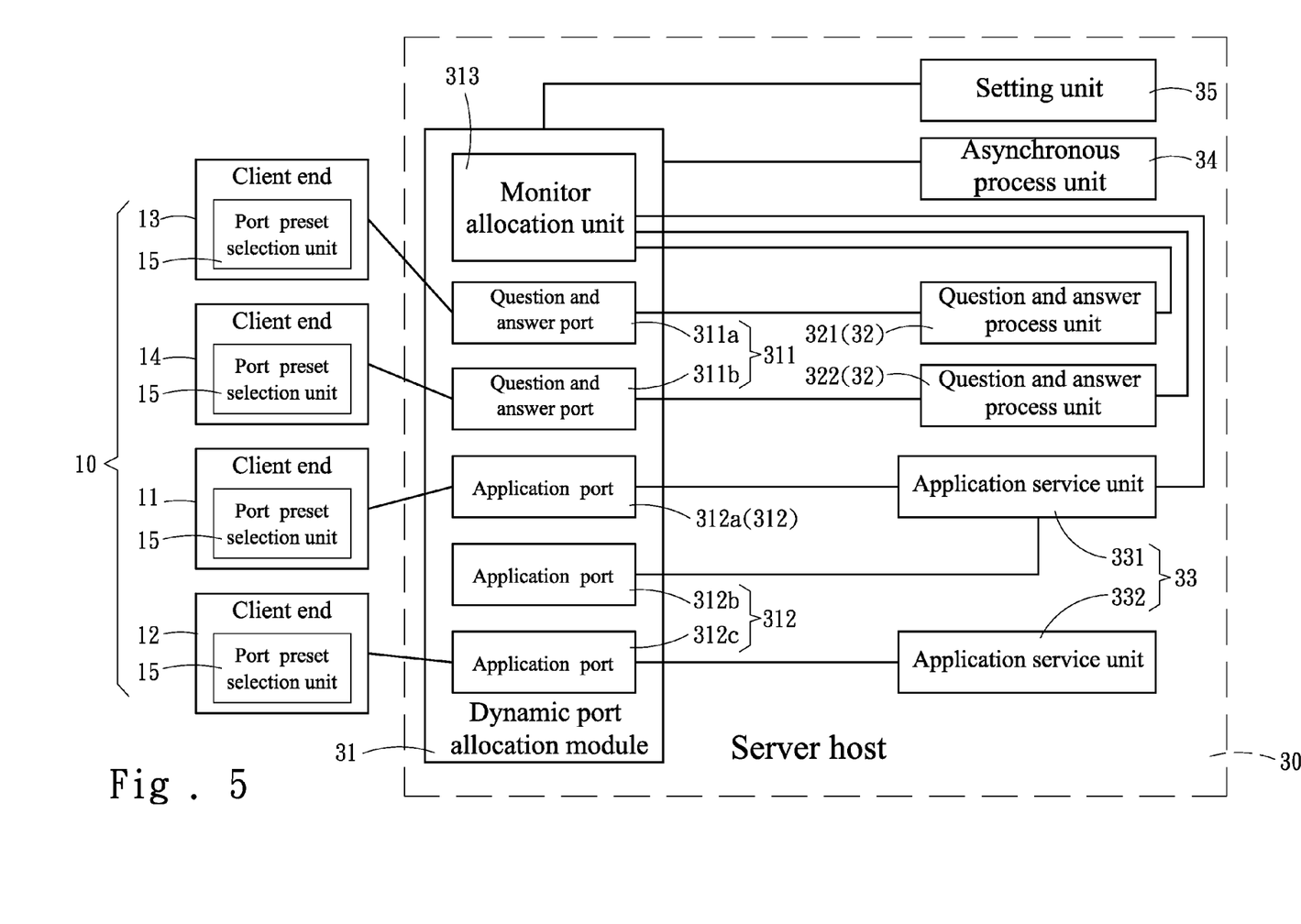
FIG. 5 is a schematic view of connecting a new client end port according to the invention.

S6: Continue question and answer services: Please referring to FIG. 5, after the transferred connection is finished, the question and answer port 311a corresponding to the question and answer process unit 321 becomes idle, and can provide connection to another client end 13. Similarly, the question and answer port 311b corresponding to another question and answer process unit 322 also becomes idle and can provide connection to yet another client end 14.

Through repeatedly process of the aforesaid steps and allocation of the ports distribution process effect can be accomplished. It is also to be noted that the application service unit 33 also can provide transferred connection to application services of other server hosts to achieve wider sharing and utilization of network resources.

As a conclusion, the invention can provide many advantageous features, notably:

1. The network congestion problem in a single server host based on Transmission Control Protocol (TCP/IP) is resolved, hence can overcome the non-cost-effective problem of increasing network bandwidth or network server host.

2. By collaborating the dynamic port allocation module and the question and answer process unit, client ends can be directed quickly and effectively to get a mating application service unit or group to make distributed process possible and avoid network congestion and network hacking.

3. By incorporating the port preset selection unit and the question and answer port quantity in the dynamic port allocation module to do preset setting, idle question and answer ports can be selected and connected during connection process to avoid connection queue and also avoid network congestion from taking place.

4. Through asynchronous process method bandwidth can be utilized more efficiently to allow more client ends to do connection and operation at the same time.

5. Each application service unit can be connected to a plurality of application ports to meet requirement of providing services to multiple client ends at the same time.

6. Through the dynamic port allocation module to respond and change the current connection port locations of the client ends and control connection or connection number, improper connection and illegitimate network hacking can be averted.

What is claimed is:

1. A server system connection process method preventing network congestion, comprising the steps of:
    S1: setting a port preset selection unit of at least one client end based on TCP/IP corresponding to a dynamic port allocation module of one server host, the dynamic port allocation module including a plurality of question and answer ports, a plurality of application ports and a monitor allocation unit, each question and answer port being connected to a question and answer process unit;
    S2: connecting the client end to an idle one of the plurality of question and answer ports of the server host via the port preset selection unit through an Internet, wherein the port preset selection unit resets connection positions of the question and answer ports based on the TCP/IP and selects the idle question and answer ports via automatic polling to establish a connection between the idle one of the plurality of question and answer ports and the client end;
    S3: processing question and answer through the question and answer process unit connected to the question and answer port, and selecting a suitable application service unit among application service units in the server host;
    S4: confirming an idle application port corresponding to the application service unit through a monitor allocation unit;
    S5: transferring connection of the client end to the idle application port to link the application service unit to execute application service; and
    S6: continuing connection for another client end after the transferring connection is finished and the question and answer port of the question and answer process unit being idle.

2. The server system connection process method preventing network congestion of claim 1, wherein at step S2 the port preset selection unit connects to one of the plurality of the question and answer ports sequentially until connected a question and answer port which is idle.

3. The server system connection process method preventing network congestion of claim 1, wherein at steps S2 and S4 the question and answer ports and the application ports are connected asynchronously to the client end, the question and answer process units and the application service units.

4. The server system connection process method preventing network congestion of claim 1, wherein at step S5 each application service unit is corresponding to a plurality of the application ports, connection being made to another application port when one application port is occupied in connection.

5. The server system connection process method of preventing network congestion claim 1, wherein at step S5 the dynamic port allocation module sends a location message of the idle application port to the client end to change connection according to a corresponding port location.

\* \* \* \* \*